(12) United States Patent
Chen et al.

(10) Patent No.: US 12,489,161 B2
(45) Date of Patent: Dec. 2, 2025

(54) SECONDARY BATTERY AND BATTERY MODULE

(71) Applicant: Contemporary Amperex Technology (Hong Kong) Limited, Hong Kong (CN)

(72) Inventors: Ning Chen, Ningde (CN); Haizu Jin, Ningde (CN); Dongyang Shi, Ningde (CN); Zhenhua Li, Ningde (CN); Fei Hu, Ningde (CN); Yuanbao Chen, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 894 days.

(21) Appl. No.: 17/362,960

(22) Filed: Jun. 29, 2021

(65) Prior Publication Data

US 2021/0328293 A1  Oct. 21, 2021

Related U.S. Application Data (63) Continuation of application No. PCT/CN2019/076266, filed on Feb. 27, 2019.

(30) Foreign Application Priority Data

Dec. 29, 2018  (CN) .......................... 201811646743.0

(51) Int. Cl.
*H01M 50/171* (2021.01)
*H01M 50/209* (2021.01)
(Continued)

(52) U.S. Cl.
CPC ....... *H01M 50/171* (2021.01); *H01M 50/209* (2021.01); *H01M 50/533* (2021.01); *H01M 50/538* (2021.01); *H01M 50/54* (2021.01)

(58) Field of Classification Search
CPC .. H01M 50/15; H01M 50/171; H01M 50/209; H01M 50/533; H01M 50/536;
(Continued)

(56) References Cited

U.S. PATENT DOCUMENTS

2014/0349149 A1  11/2014  Kim
2018/0294535 A1*  10/2018  Choi ................. H01M 10/6551

FOREIGN PATENT DOCUMENTS

CN    101826609 A    9/2010
CN    206650130 U    11/2017
(Continued)

OTHER PUBLICATIONS

The First Office Action for Chinese Application No. 201811646743.0, dated Mar. 9, 2024, 9 pages.
(Continued)

*Primary Examiner* — Matthew T Martin
*Assistant Examiner* — Ankith R Sripathi
(74) *Attorney, Agent, or Firm* — East IP P.C.

(57) ABSTRACT

The present disclosure relates to a secondary battery and a battery module. The secondary battery includes a case including a receiving space with an opening; a cap assembly connected to the case and close the opening; an electrode assembly disposed in the receiving space and including two end faces opposite to each other in a first direction perpendicular to an axial direction of the receiving space, and tabs extending from the end faces and two or more electrode units stacked in the axial direction; and a current collecting unit, including a first piece extending in the axial direction and a first current collecting piece connected to the first piece, the tab extends in the first direction and is connected to the first current collecting piece, and a portion of the tab connected to the first current collecting piece and the first current collecting piece are stacked in the axial direction.

19 Claims, 9 Drawing Sheets

(51) Int. Cl.
*H01M 50/533* (2021.01)
*H01M 50/538* (2021.01)
*H01M 50/54* (2021.01)

(58) Field of Classification Search
CPC ... H01M 50/538; H01M 50/54; H01M 50/553
See application file for complete search history.

(56) References Cited

FOREIGN PATENT DOCUMENTS

| | | | |
|---|---|---|---|
| CN | 108198989 | A | 6/2018 |
| CN | 108428921 | A | 8/2018 |
| CN | 207800665 | U | 8/2018 |
| CN | 209217103 | U | 8/2019 |
| JP | 2014096374 | A | 5/2014 |
| WO | 2014027606 | A1 | 2/2014 |

OTHER PUBLICATIONS

Haoliang Yang et al. Research on tab bending for laminated lithium-ion battery, battery Industry, issue 2, dated Apr. 25, 2018, 3 pages.
The International search report for PCT Application No. PCT/CN2019/076266, dated Sep. 26, 2019, 11 pages.
The extended European search report for EP Application No. 19848926.2, dated May 11, 2023, 5 pages.

* cited by examiner

SECONDARY BATTERY AND BATTERY MODULE

CROSS REFERENCE TO RELATED APPLICATION

This application is a continuation of International Application No. PCT/CN2019/076266, filed on Feb. 27, 2019, and claims priority to Chinese Patent Application No. 201811646743.0, titled "SECONDARY BATTERY AND BATTERY MODULE" and filed on Dec. 29, 2018, both of which are hereby incorporated by reference in their entireties.

TECHNICAL FIELD

The present disclosure relates to a technical field of batteries, and particularly relates to a secondary battery and a battery module.

BACKGROUND

With the development of science and technology, secondary batteries have been widely used in portable electronic devices such as mobile phones, digital video cameras, and laptop computers. The secondary batteries also have a broad application prospect in large and medium-sized electric equipment, such as electric vehicles, for example, electric automobiles and electric bicycles, and energy storage facilities, and have become an important technical means to solve global problems such as energy crisis and environmental pollution. In the prior art, tabs of the secondary batteries need to be bent to a direction intersecting with an extension direction of the tabs and then connected to current collecting members. Since the tabs are subjected to tensile stress after the bending, they are prone to break, which seriously affects a production yield of the secondary batteries.

SUMMARY

Embodiments of the present disclosure provide a secondary battery and a battery module. Tabs included in the secondary battery may be connected to a first current collecting piece without bending, thereby avoiding the tabs from being broken due to excessive tensile stress caused by the bending.

On one aspect, the embodiments of the present disclosure provide a secondary battery, including:

a case, including a receiving space with an opening; a cap assembly, connected to the case in a sealed manner to close the opening; an electrode assembly disposed in the receiving space, wherein the electrode assembly comprises two end faces opposite to each other in a first direction perpendicular to an axial direction of the receiving space, and tabs extending from the end faces, wherein the electrode assembly includes two or more electrode units stacked in the axial direction; and a current collecting unit, including a first piece and a first current collecting piece connected to the first piece, wherein the first piece extends in the axial direction, the tab extends in the first direction and is connected to the first current collecting piece, and a portion of the tab connected to the first current collecting piece and the first current collecting piece are stacked in the axial direction.

The secondary battery according to the embodiments of the present disclosure includes the case, the electrode assembly disposed in the case, the cap assembly that seals the case, and the current collecting unit for connecting the cap assembly and the electrode assembly. The current collecting unit includes the first piece and the first current collecting piece connected to the first piece. The tab of the electrode assembly is connected to the first current collecting piece. The tab of the electrode assembly extends from the end face of the electrode assembly substantially in a straight line in the first direction, and is connected to the first current collecting piece. A portion of the tab connected to the first current collecting piece and the first current collecting piece are stacked in the axial direction. Since the tab may be connected to the first current collecting piece without bending operation after extending from the end face, the entire tab will not be broken due to excessive tensile stress caused by the bending, which effectively improves a production yield of the secondary battery.

On a further aspect, the embodiments of the present disclosure provide a battery module, which includes two or more secondary batteries according to the above embodiments, wherein the two or more secondary batteries are arranged side by side.

BRIEF DESCRIPTION OF THE DRAWINGS

Features, advantages, and technical effects of exemplary embodiments of the present disclosure will be described below with reference to the accompanying drawings.

In the drawings, the drawings are not drawn to actual scale.

REFERENCE NUMERALS 10, secondary battery; 11, case; 11a, receiving space; 12, cap assembly; 121, cap plate; 122, electrode terminal; 13, electrode assembly; 13a, end face; 13b, tab; 131, electrode unit; 131a, wide surface; 131b, narrow surface; 131c, sub-end face; 131d, sub-tab; 14, current collecting unit; 141, first piece; 141a, main body portion; 141*b*, extension portion; 142, first current collecting piece; 142*a*, first connection end; 143, second current collecting piece; 143*a*, second connection end; 144, first connection piece; 145, second connection piece; 146, second piece; 146*a*, boss; X, axial direction; Y, first direction; Z, second direction; 20, battery module.

DETAILED DESCRIPTION

Below, embodiments of the present disclosure will be further described in detail with reference to the accompanying drawings and embodiments. The detailed description of the embodiments and the accompanying drawings are intended to exemplarily illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality" is two or more; the orientations or positional relationships indicated by the terms "upper", "lower", "left", "right", "inner", "outer" and the like are merely for the purpose of describing the present disclosure and simplifying the description, and are not intended to indicate or imply that the device or component referred to has a particular orientation, is constructed and operated in a particular orientation, and therefore cannot be understood as a limitation of the present disclosure. Moreover, the terms "first", "second", "third" and the like are used for descriptive purposes only and are not to be construed as indicating or implying relative importance.

In the description of the present disclosure, it should be noted that, unless otherwise specified and stated clearly, the terms "install", "connect", and "couple" are to be understood broadly, and may be, for example, a fixed connection, a disassemble connection, or an integral connection, and may be a direct connection or an indirect connection via an intermediate medium. The specific meaning of the above terms in the present disclosure can be understood by the person skilled in the art according to actual circumstance.

In order to better understand the present disclosure, the battery module 20 and the secondary battery 10 according to the embodiments of the present disclosure are described in detail below with reference to FIGS. 1-9.

Figure 1:
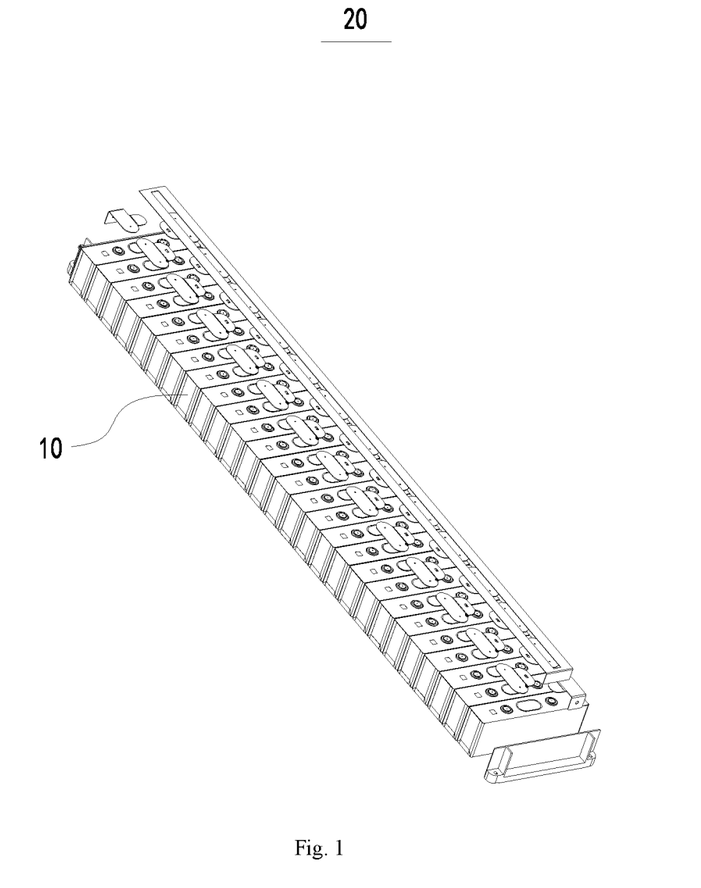
FIG. 1 is a schematic diagram showing a configuration of a battery module according to an embodiment of the present disclosure.

Referring to FIG. 1, an embodiment of the present disclosure provides a battery module 20, which includes: two or more secondary batteries 10 of the present embodiment and a busbar for connecting two secondary batteries 10. The two or more secondary batteries 10 are arranged side by side in a same direction. One end of the busbar is fixedly connected to one of two secondary batteries 10, and the other end is fixedly connected to the other one of the two secondary batteries 10. The two or more secondary batteries 10 of the present embodiment can be arranged side by side in a thickness direction of the secondary batteries 10 to constitute a battery module 20.

Figure 2:
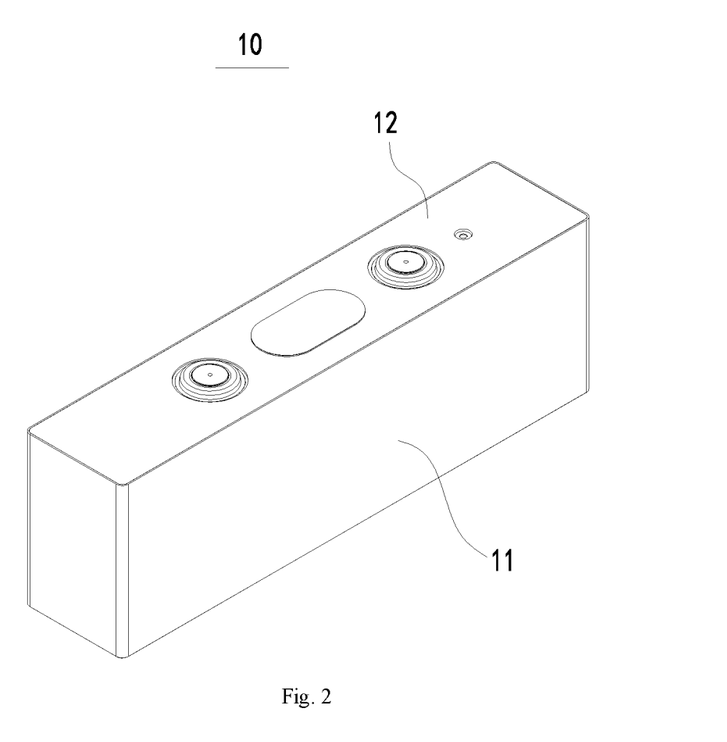
FIG. 2 is a schematic diagram showing a configuration of a secondary battery according to an embodiment of the present disclosure.
Figure 3:
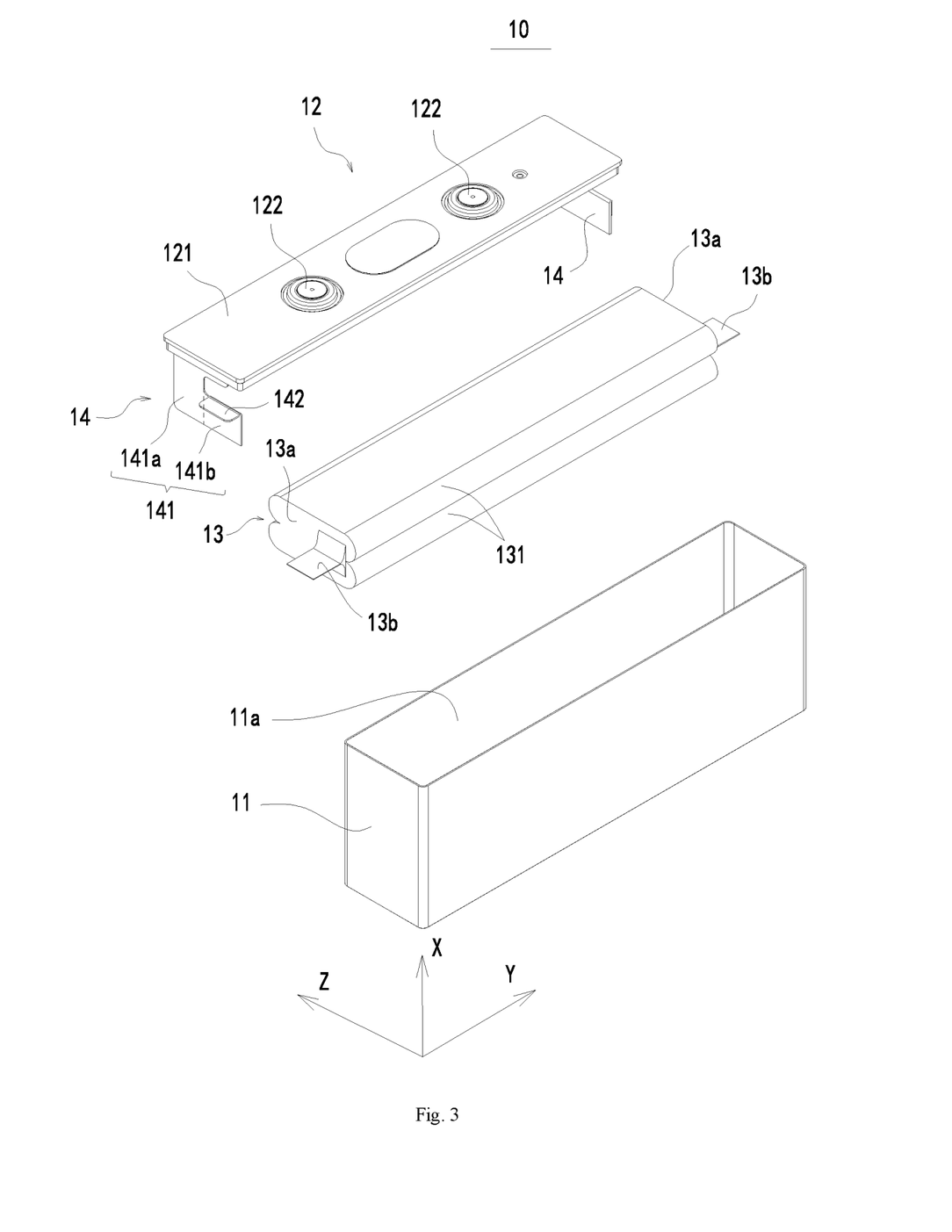
FIG. 3 is a schematic exploded view showing a configuration of a secondary battery according to an embodiment of the present disclosure.
Figure 4:
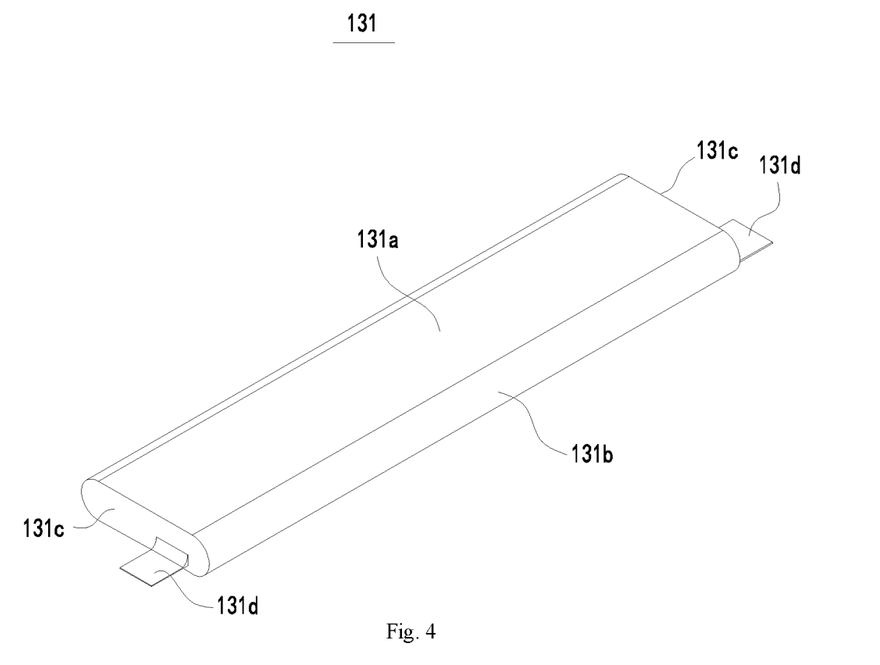
FIG. 4 is a schematic diagram showing a configuration of an electrode unit according to an embodiment of the present disclosure.

Referring to FIGS. 2 and 3, the secondary battery 10 according to the embodiment of the present disclosure includes a case 11, an electrode assembly 13 disposed in the case 11, and a cap assembly 12 which is connected to the case 11 in a sealed manner.

The case 11 of the present embodiment may be formed in a quadrangular prism shape or in other shapes. The case 11 includes a receiving space 11*a* with an opening. The receiving space 11*a* is used to receive the electrode assembly 13 and electrolyte. The case 11 may be made of a material such as aluminum, aluminum alloy, or plastic.

The electrode assembly 13 according to the embodiment of the present disclosure includes two end faces 13*a* opposite to each other in a first direction Y perpendicular to an axial direction X of the receiving space 11*a*, and two tabs 13*b*, each extending from the respective end face 13*a*. The axial direction X of the receiving space 11*a* is parallel to an extending direction of the receiving space 11*a*. In the present embodiment, each end face 13*a* of the electrode assembly 13 is extended with one tab 13*b*, and each electrode assembly 13 has two tabs 13*b* opposite to each other in the first direction Y, wherein one of the two tabs 13*b* serves as a positive tab and the other serves as a negative tab.

As shown in FIG. 3, the electrode assembly 13 of the present embodiment includes two or more electrode units 131 stacked in the axial direction X of the receiving space 11*a*. The electrode unit 131 of the present embodiment may include a main body, which is constituted by stacking or winding a first electrode plate, a second electrode plate and a separator together, and sub-tabs 131*d* connected to the main body. The separator is an insulator interposed between the first electrode plate and the second electrode plate. The electrode unit 131 of the present embodiment includes one layer of the separator, one layer of the first electrode plate, one layer of the separator, and one layer of the second electrode plate. In the present embodiment, the description is made by exemplarily taking the first electrode plate as a positive electrode plate, and taking the second electrode plate as a negative electrode plate. Similarly, in other embodiments, the first electrode plate may serve as the negative electrode plate, and the second electrode plate serves as the positive electrode plate. Further, a positive active material is coated on a coating region of the positive electrode plate, and a negative active material is coated on a coating region of the negative electrode plate. Uncoated regions extending from the main body act as the sub-tabs. As shown in FIG. 3, the electrode unit 131 includes two sub-end faces 131*c* opposite to each other in the first direction Y and two sub-tabs 131*d*. The two sub-tabs serve as a positive tab and a negative tab, respectively. The positive tab extends out from the coated region of the positive electrode plate; and the negative tab extends out from the coated region of the negative electrode plate. The first direction Y is perpendicular to the axial direction X. However, the perpendicularity here is not limited to the strict definition of "perpendicularity" in the mathematical sense. The end face 13*a* of each electrode assembly 13 includes the sub-end faces 131*c* of the respective electrode units 131, and the tab 13*b* of each electrode assembly 13 includes the sub-tabs 131*d* of the respective electrode units 131. In one embodiment, referring to FIG. 4, the electrode unit 131 is formed in a flat shape, and includes two wide surfaces 131*a* and two narrow surfaces 131*b* connecting the two wide surfaces 131*a*. The two wide surfaces 131*a* are opposite to each other in the axial direction X. The two wide surfaces 131*a* and the two narrow surfaces 131*b* are alternately arranged.

The cap assembly 12 of the present embodiment is connected to the case 11 in a sealed manner, to close the opening. In one embodiment, the cap assembly 12 includes a cap plate 121 and electrode terminals 122. The cap assembly 12 is connected to the case 11 in a sealed manner via the cap plate 121. The electrode terminals 122 are disposed on the cap plate 121 and are electrically connected to the electrode assembly 13 via current collecting units 14.

As shown in FIG. 2, the current collecting unit 14 according to the embodiment of the present disclosure is used to connect the electrode assembly 13 with the electrode terminal 122 of the cap assembly 12. The current collecting unit 14 includes a first piece 141 and a first current collecting piece 142 connected to the first piece 141. The first piece 141 extends in the axial direction X. The tab 13b extends in the first direction Y and is connected to the first current collecting piece 142. A portion of the tab 13b connected to the first current collecting piece 142 and the first current collecting piece 142 are stacked in the axial direction X. In one embodiment, a surface of the first current collecting piece 142 for connecting with the tab 13b and a surface of the tab 13b for connecting with the first current collecting piece 142 are substantially at the same horizontal plane, so that the surface of the tab 13b for connecting with the first current collecting piece 142 may be directly connected to the first current collecting piece 142, after the tab 13 extends directly from the end face 13a of the electrode assembly 13. As such, there is no need to perform a bending operation on the tab 13b and then connect a free end of the tab 13b to the first current collecting piece 142 after the bending operation, thereby avoiding the tab 13b from being subjected to excessive tensile stress due to the bending operation and thus avoiding breakages or cracks of the tab 13b, which may reduce a failure rate of the electrode assembly 13 due to the failure of the tab 13b, improve a production yield of the secondary battery 10, and effectively reduce a production cost.

The first current collecting piece 142 in the embodiment of the present disclosure includes a first connection end 142 connected with the first piece 141. The first connection end 142a extends in a second direction Z that is perpendicular to both the axial direction X and the first direction Y. A thickness direction of the first current collecting piece 142 is the same as the axial direction X. As such, two surfaces of the first current collecting piece 142 opposite to each other in the axial direction X have relatively large areas, so that the connection between the tab 13b with any one of the two surfaces is more stable and reliable.

The first current collecting plate 142 in the embodiment of the present disclosure is located on a side of the first piece 141 close to the case 11. The tab 13b is connected to a surface of the first current collecting piece 142 facing or facing away from the cap assembly 12. As such, the first current collecting piece 142 is disposed away from the electrode assembly 13, and a sufficiently large yielding space can be reserved on opposite sides of the first current collecting piece 142 in the axial direction X. When the first current collecting piece 142 and the tab 13b are connected by ultrasonic welding, it is convenient for an ultrasonic device to clamp the first current collecting piece 142 from both sides of the first current collecting piece 142 in the axial direction X, thereby facilitating an ultrasonic welding operation.

Figure 5:
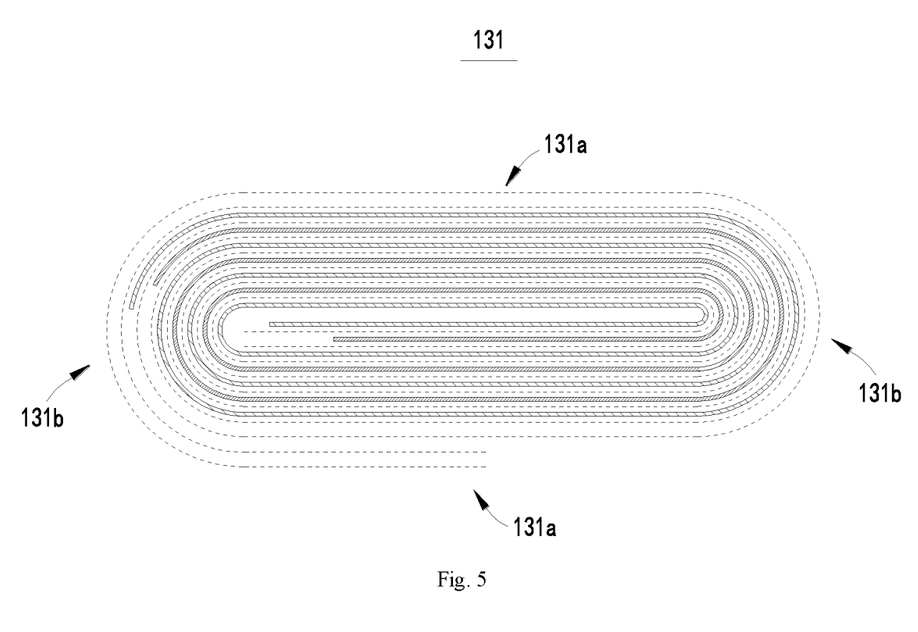
FIG. 5 is a schematic cross-sectional view showing a configuration of an electrode unit according to an embodiment of the present disclosure.
Figure 6:
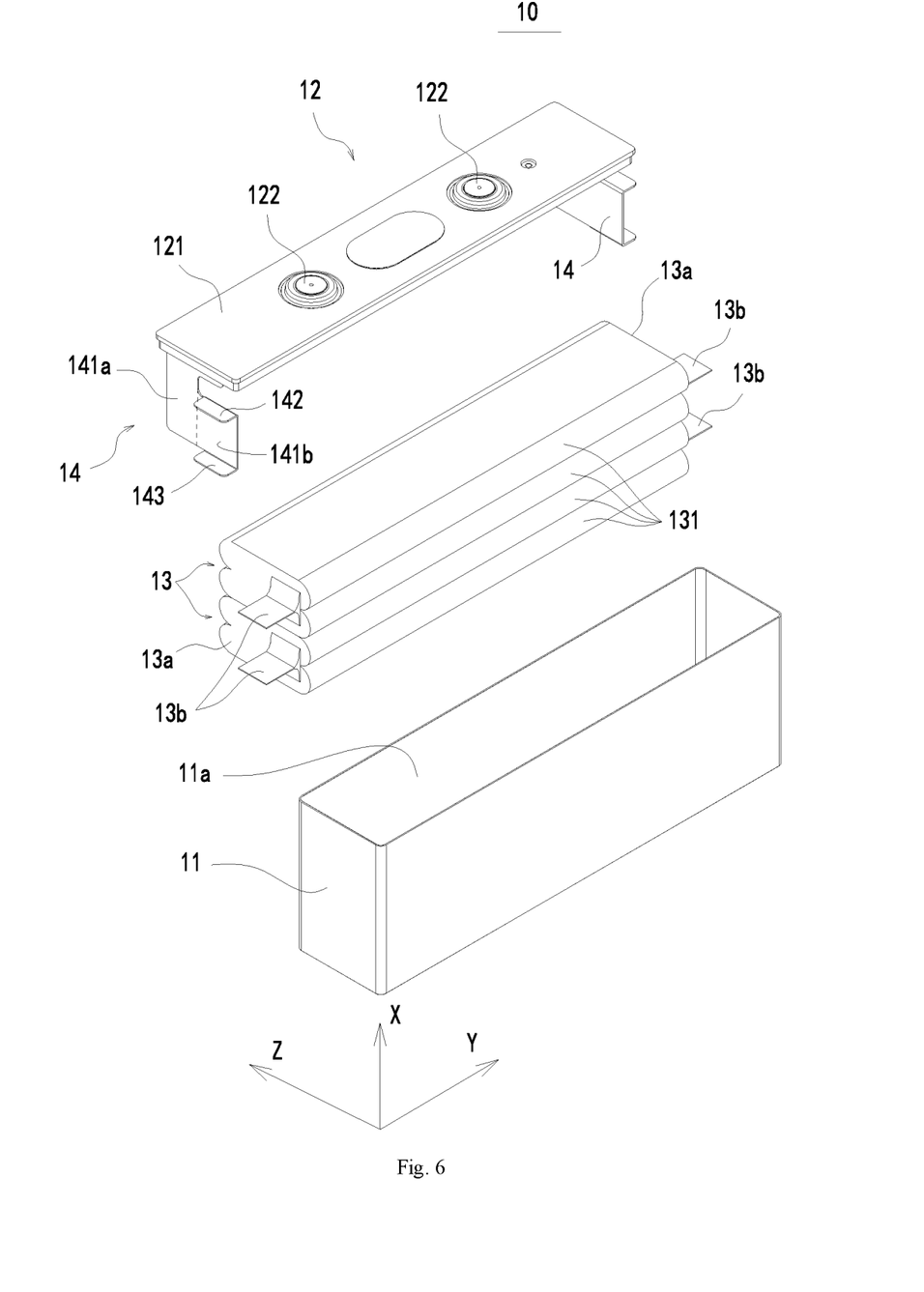
FIG. 6 is a schematic exploded view showing a configuration of a secondary battery according to another embodiment of the present disclosure.

Referring to FIG. 5 and FIG. 6, the current collecting unit 14 according to the embodiment of the present disclosure further includes a second current collecting piece 143 connected to the first piece 141. The first current collecting piece 142 and the second current collecting piece 143 are both located on a side of the first piece 141 close to the case 11. The first current collecting piece 142 and the second current collecting piece 143 are located on the same side of the first piece 141. The first current collecting piece 142 and the second current collecting piece 143 are spaced apart with a predetermined distance in a second thickness direction to generate a yielding space between them. When the first current collecting piece 142 and the second current collecting piece 143 are respectively connected to the tabs 13b by the ultrasonic welding, it is convenient for the ultrasonic device to clamp the first current collecting piece 143 from both sides of the first current collecting piece 142 or the second current collecting piece 143 in the second thickness direction, thereby facilitating the ultrasonic welding operation. There are two electrode assemblies 13. The two electrode assemblies 13 are stacked in the axial direction X. The tab 13b of one electrode assembly 13 is electrically connected to the first current collecting piece 142, and the tab 13b of the other electrode assembly 13 is electrically connected to the second current collecting piece 143. A portion of the tab 13b connected to the second current collecting piece 143 and the second current collecting piece 143 are stacked in the axial direction X. As such, there is no need to perform a bending operation on the tab 13b of the electrode assembly 13 and then connect a free end of the tab 13b to the second current collecting piece 143 after the bending operation, thereby avoiding the tab 13b from being subjected to excessive tensile due to the bending operation, and thus avoiding breakages or cracks of the tab 13b, which may reduce the failure rate of the electrode assembly 13 due to the failure of the tab 13b.

Referring to FIG. 6, the first piece 141 according to the embodiment of the present disclosure includes a main body portion 141a extending in the axial direction X and an extension portion 141b connected to the main body portion 141a. The extension portion 141b extends beyond the main body portion 141a in the second direction Z perpendicular to both the axial direction X and the first direction Y. The first current collecting piece 142 and the second current collecting piece 143 are respectively connected to both ends of the extension portion 141b in the axial direction X. Since the first current collecting piece 142 and the second current collecting piece 143 are respectively connected to the two opposite ends of the extension portion 141b, the tab 13b may be fixedly connected to the first current collecting piece 142 or the second current collecting piece 143 without extending very long. Therefore, an extension length of the tab 13b may be effectively shortened, which is conducive to reduce a space occupancy rate of the tab 13b, increase an energy density of the secondary battery 10, and also effectively reduce a processing cost.

In one embodiment, the first current collecting piece 142 is disposed closer to the cap assembly 12 than the second current collecting piece 143. The tab 13b of one electrode assembly 13 is connected to a surface of the first current collecting piece 142 facing the cap assembly 12, and the tab 13b of the other electrode assembly 13 is connected to a surface of the second current collecting piece 143 facing away from the cap assembly 12, so that the first current collecting piece 142 and the second current collecting piece 143 are located between the two tabs 13b. On the one hand, it is convenient for the first current collecting piece 142 and the second current collecting piece 143 to be welded to the corresponding tabs 13b; on the other hand, a maximum size of the first current collecting piece 142, the second current collecting piece 143 and the two tabs 13b in the axial direction X may be reduced, which is conducive to reduce a space occupancy rate of the first current collecting piece 142, the second current collecting member 143 and the two tabs 13b in the axial direction X, and increase the energy density of the secondary battery 10. In one embodiment, the first current collecting piece 142 and the second current collecting piece 143 are at least partially overlapped in the axial direction X, which is conducive to reduce a space occupancy rate of the first current collecting piece 142 and the second current collecting piece 143 in the second direction Z. In an embodiment, the first current collecting piece 142 and the second current collecting piece 143 have the same configuration, and the first current collecting piece 142 and the second current collecting piece 143 are aligned in the axial direction X.

Figure 8:
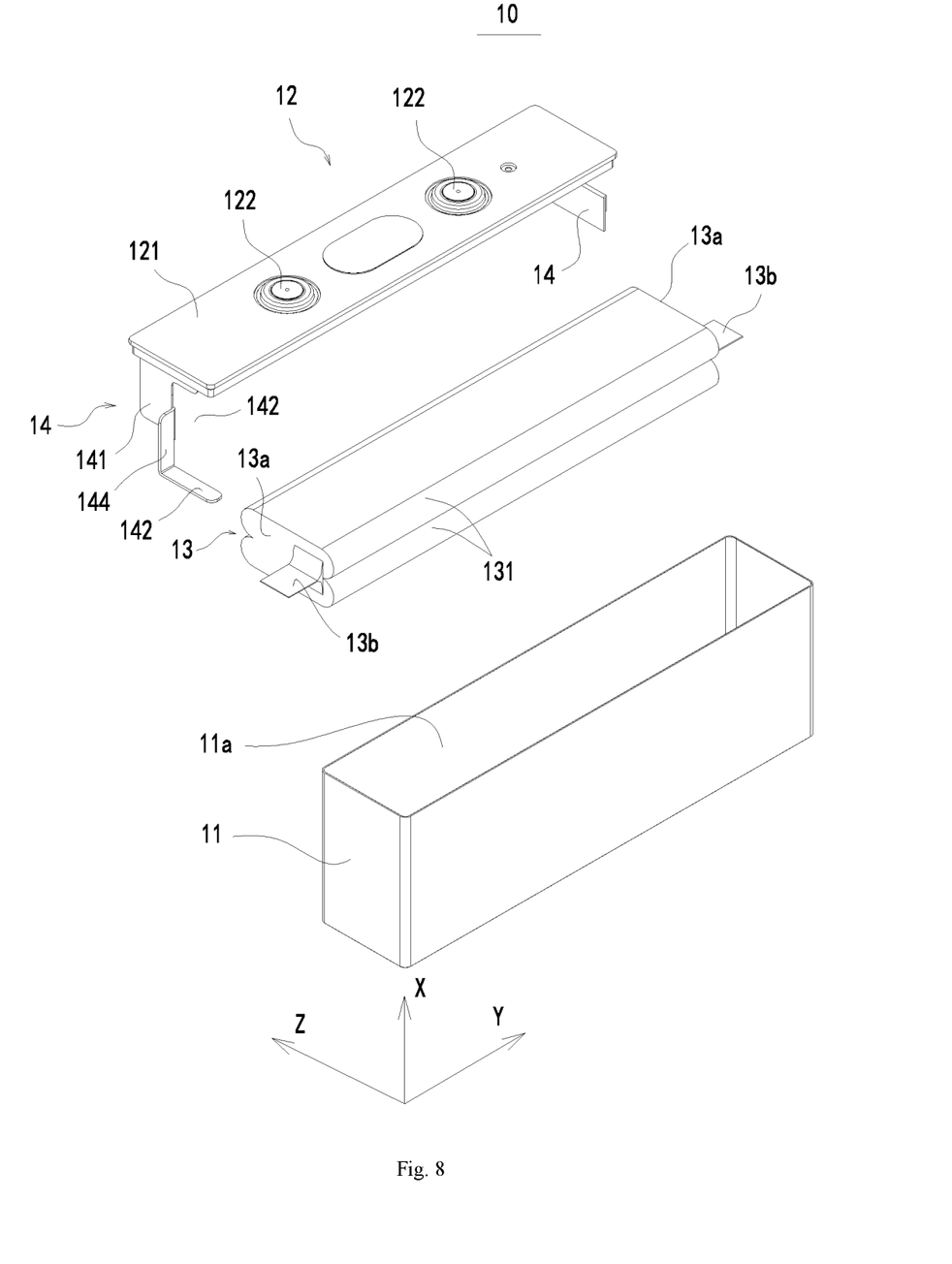
FIG. 8 is a schematic exploded view showing a configuration of a secondary battery according to another embodiment of the present disclosure.

In one embodiment, referring to FIG. 8, the current collecting unit 14 further includes a first connection piece 144 connected to the first piece 141. The first connection piece 144 extends in the axial direction X and a thickness direction of the first connection piece 144 is parallel to the second direction Z. The first current collecting piece 142 is connected to the first piece 141 via the first connection piece 144. In one embodiment, the first current collecting piece 142 extends in the second direction Z, and intersects with the first connection piece 144. The tab 13b may be connected to a surface of the first current collecting piece 142 facing or facing away from the cap assembly 12. The first connection piece 144 is located on one side of the tab 13b in the second direction Z, so that the first connection piece 144 may not extend beyond the tab 13b in the first direction Y, which is conducive to reduce a space occupancy rate of the first connection piece 144 and increase the energy density of the secondary battery 10. The first current collecting piece 142 is overlapped with the tab 13b in the axial direction X, so that the first current collecting piece may not extend beyond the tab 13b in the first direction Y either, which is further conducive to reduce the space occupancy rate of the first current collecting piece 142, and increase the energy density of the secondary battery 10. In one embodiment, the first current collecting piece 142 includes a first connection end 142a connected to the first connection piece 144, and the first connection end 142a extends in the first direction Y. A thickness direction of the first current collecting piece 142 is the same as the axial direction X. The first current collecting piece 142 is disposed far away from the electrode assembly 13, and a sufficiently large yielding space may be reserved on opposite sides of the first current collecting piece in the axial direction X. When the first current collecting piece 142 and the tab 13b are connected by the ultrasonic welding, it is convenient for the ultrasonic device to clamp the first current collecting piece 142 from both sides of the first current collecting piece 142 in the axial direction X, thereby facilitating the ultrasonic welding operation.

Figure 9:
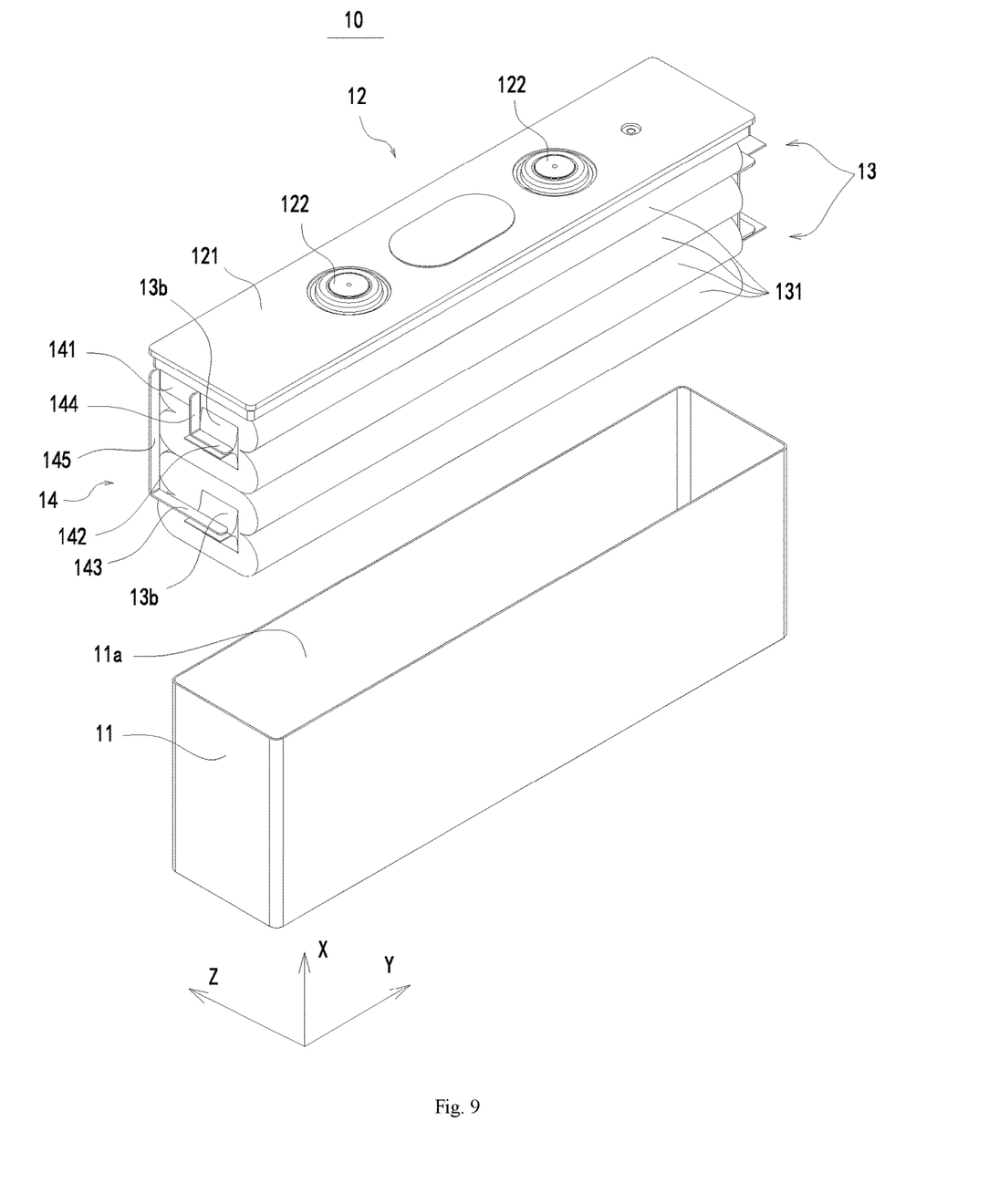
FIG. 9 is a schematic exploded view showing a configuration of a secondary battery according to another embodiment of the present disclosure.
Figure 10:
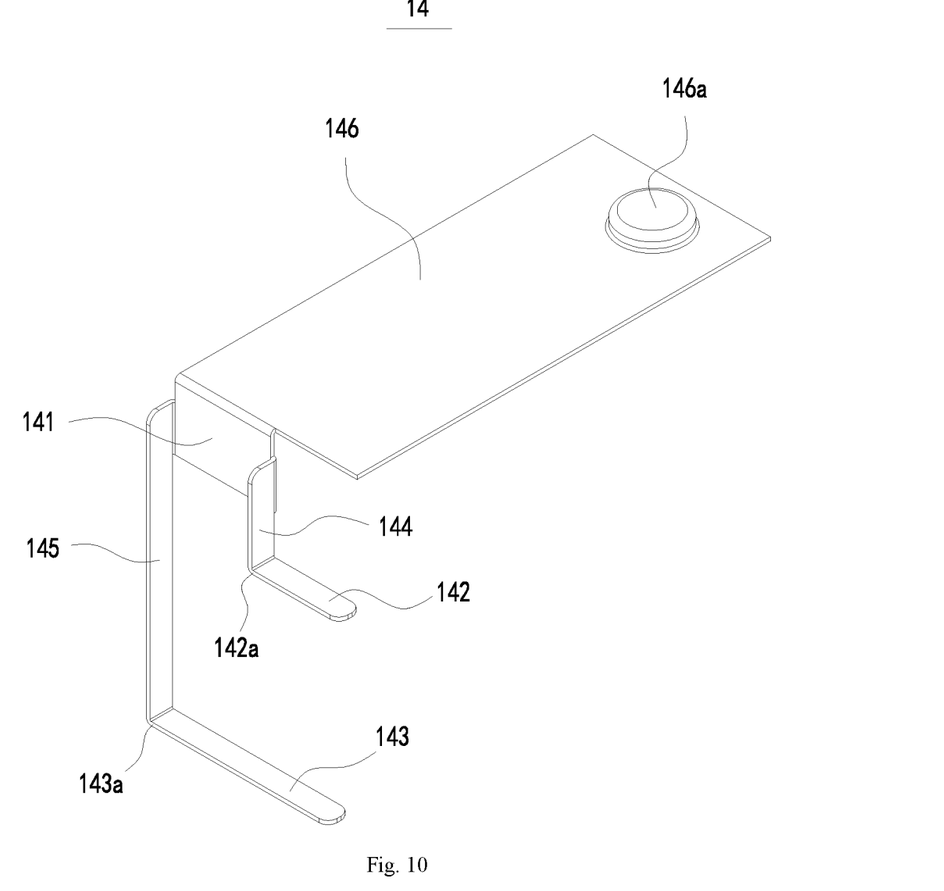
FIG. 10 is a schematic diagram showing a configuration of a current collecting unit in the embodiment of FIG. 9.

In one embodiment, referring to FIGS. 9 and 10, the current collecting unit 14 further includes a first connection piece 144 and a second connection piece 145 both connected to the first piece 141. The first connection piece 144 and the second connection piece 145 are spaced apart in the second direction Z and both extend in the axial direction X. The first current collecting piece 142 is connected to the first piece 141 via the first connection piece 144. The second current collecting piece 143 is connected to the first piece 141 via the second connection piece 145. In one embodiment, the first current collecting piece 142 and the second current collecting piece 143 both extend in the second direction Z, and respectively intersect with the first connection piece 144 and the second connection piece 145. The tabs 13b may be connected to surfaces of the first current collecting piece 142 and the second current collecting piece 143 facing or facing away from the cap assembly 12. In the second direction Z, the first connection piece 144 and the second connection piece 145 are both located on one side of the tabs 13b, so that the first connection piece 144 and the second connection piece 145 may not extend beyond their respective corresponding tabs 13b in the first direction Y, which is conducive to reduce a space occupancy rate of the first connection piece 144 and the second connection piece 145, and increase the energy density of the secondary battery 10. Both the first current collecting piece 142 and the second current collecting piece 143 overlap with their respective corresponding tabs 13b in the axial direction X, so that both the first current collecting piece 142 and the second current collecting piece 143 may not extend beyond their respective corresponding tabs 13b in the first direction Y, which is further conducive to reduce the space occupancy rate of the first current collecting piece 142 and the second current collecting piece 143, and increase the energy density of the secondary battery 10. In one embodiment, the first current collecting piece 142 is disposed closer to the cap assembly 12 than the second current collecting piece 143, the tab 13b of one electrode assembly 13 is connected to a surface of the first current collecting piece 142 facing or facing away from the cap assembly 12, and the tab 13b of the other electrode assembly 13 is connected to a surface of the second current collecting piece 143 facing or facing away from the cap assembly 12.

The first current collecting piece 142 in the embodiment of the present disclosure includes a first connection end 142a connected to the first piece 141. The second current collecting piece 143 includes a second connection end 143a connected to the first piece 141. Both of the first connection end 142a and the second connection end 143a extend in the first direction Y. Thickness directions of the first current collecting piece 142 and the second current collecting piece 143 are the same as the axial direction X. In one embodiment, the first current collecting piece 142 and the second current collecting piece 143 are both formed in a rectangular shape, and their respective length directions are the same as the second direction Z.

In one embodiment, there are two electrode assemblies 13. The two electrode assemblies 13 are stacked in the axial direction X. Each electrode assembly 13 includes two electrode units 131. Each electrode unit 131 includes sub-end faces 131c and sub-tabs 131d extending from the sub-end faces 131c. Two sub-end faces 131c on the same side of the electrode units constitute the end face 13a. Two sub-tabs 131d of the same polarity are assembled to the tab 13b. The sub-tab 131d of one electrode unit 131 extends out from a region of the sub-end face 131c close to the other electrode unit 131 in the axial direction X, so that the respective sub-tabs 131d of the two electrode units 131 are close to each other and may be assembled to the tab 13b, which is fixedly connected with the first current collecting piece 142 and the second current collecting piece 143, with a relatively short extension. As such, on the one hand, the sub-tab 131d will not be redundant in length due to its own excessive long extension. When the sub-tab 131d is redundant, it is easy to cause a bending of the sub-tab 131d, thereby causing a stress concentration area and breakage of the sub-tab 131d. On the other hand, the extension of the sub-tab 131d is relatively short, which is conducive to reduce the space occupancy rate of the tab 13b constituted by the sub-tabs 131d, and increase the energy density of the secondary battery 10.

In one embodiment, the electrode unit 131 includes two wide surfaces 131a and two narrow surfaces 131b connecting the two wide surfaces 131a. The two wide surfaces 131a are opposite to each other in the axial direction X, and the wide surfaces 131a and the narrow surfaces 131b are alternately arranged. Referring to FIG. 3 or FIG. 8, each electrode assembly 13 includes two electrode units 131. The tab 13b extends from a region of the end face 13a close to two adjacent wide surfaces 131a of the two electrode units 131, so that in the axial X direction, the tab 13b is located approximately in a central region of the end face 13a. As a result, it can be ensured that the two sub-tabs 131d drawn from the two electrode units 131 have substantially the same dimension, which is conducive to keep consistency of manufacturing process of the electrode units 131 and reduce manufacturing cost.

Figure 7:
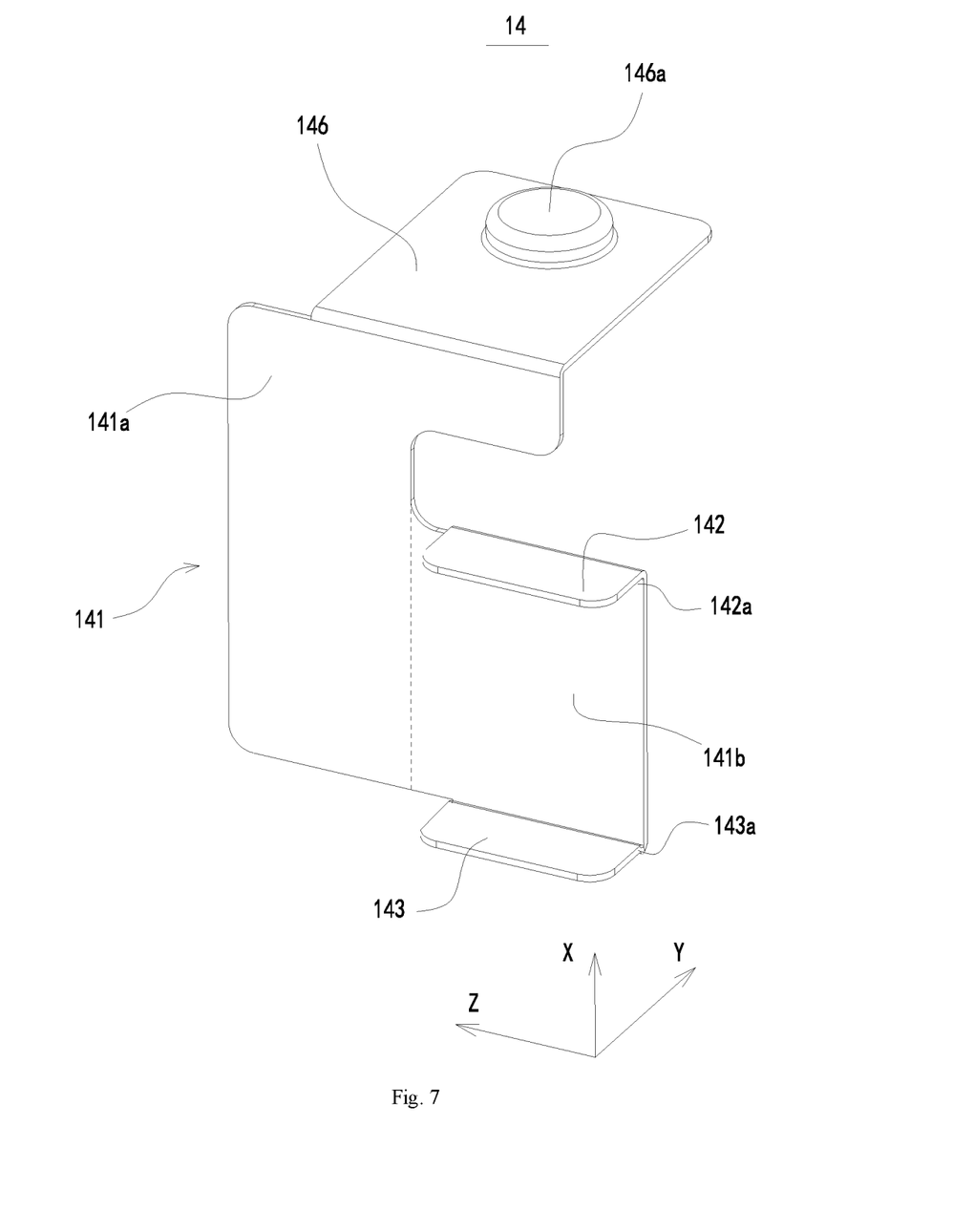
FIG. 7 is a schematic diagram showing a configuration of a current collecting unit in the embodiment of FIG. 6.

In one embodiment, referring to FIG. 7 or FIG. 10, the current collecting unit further includes a second piece 146 connected to the first piece 141. A thickness direction of the second piece 146 in the present embodiment is the same as the axial direction X. The second piece 146 includes a boss 146a disposed away from the electrode assembly 13. The second piece 146 is electrically connected to the electrode terminal 122 included in the cap assembly 12 via the boss 146a.

In one embodiment, referring to FIG. 3 or FIG. 6, there are two current collecting units 14. The cap plate 121 is provided with two electrode terminals 122, and the two current collecting units 14 are respectively connected to the two electrode terminals 122. The two current collecting units 14 are spaced apart in the first direction Y. In the first direction Y, the electrode assembly 13 is disposed between the two current collecting units 14. The main body of the electrode unit 131 included in the electrode assembly 13 is located between the two current collecting units 14, while the two tabs 13b included in the electrode assembly 13 are disposed respectively corresponding to the two current collecting units 14. One of the tabs 13b is connected to one of the current collecting units 14, and the other tab 13b is connected to the other current collecting unit 14. In the present embodiment, the two current collecting units 14 are electrically connected to the corresponding tabs 13b via their respective first current collecting pieces 142.

The battery module 20 according to the embodiment of the present disclosure includes a plurality of secondary batteries 10 arranged side by side in the same direction. Since the electrode units 131 included in each secondary battery 10 of the present embodiment are stacked in the axial direction X of the receiving space 11a of the case 11, when expanding, the electrode units 131 of the present embodiment mainly expand and deform in the axial direction X of the receiving space 11a, with a small expansion amount in an arrangement direction of the secondary battery 10. As such, an expansion resultant force accumulated in the arrangement direction of the secondary batteries 10 is relatively small. In the arrangement direction of the secondary batteries 10, the battery module 20 does not need a structural member with a higher strength to constrain or counteract the expansion force, or merely needs a structural member with a lower strength to constrain or counteract the expansion force, thereby effectively reducing an overall quality of the battery module 20, making the battery module 20 more compact, and effectively improving the energy density of the battery module 20. Meanwhile, the battery module 20 has a small expansion amount in the thickness direction of the secondary batteries 10, which can effectively improve a safety during use.

Although the present disclosure has been described with reference to the above-mentioned embodiments, various modifications can be made thereto and components therein can be replaced with equivalents without departing from the scope of the present disclosure. Especially, as long as there is no structural conflict, technical features mentioned in various embodiments can be combined in any manner. The present disclosure is not limited to the specific embodiments disclosed herein, but includes all technical solutions falling within the scope of the claims.

What is claimed is:

1. A secondary battery, comprises:
   a case, comprising a receiving space with an opening;
   a cap assembly, connected to the case in a sealed manner to close the opening;
   a first electrode assembly and a second electrode assembly disposed in the receiving space, wherein each of the first and second electrode assemblies comprises two end faces opposite to each other in a first direction perpendicular to an axial direction of the receiving space, and a tab extending from one of the end faces, wherein each of the first and second electrode assemblies comprises two or more electrode units stacked in the axial direction, each of the two or more electrode units comprises a positive electrode plate, a negative electrode plate and a separator disposed between them, and the tab of each of the first and second electrode assemblies is formed by uncoated regions of positive electrode plates or negative electrode plates of the two or more electrode units; and
   a current collecting unit, comprising a first piece, a first current collecting piece connected to the first piece, and a terminal connection piece, wherein the terminal connection piece is disposed above the first and second electrode assembles, extends parallel to both the first direction and a second direction perpendicular to the axial direction and is connected with an electrode terminal of the secondary battery, and the first piece is connected with the terminal connection piece, is bent downward from one end of the terminal connection piece and extends downward in the axial direction,
   the tab of the first electrode assembly extends in the first direction and is directly connected to the first current collecting piece, and a portion of the tab of the first electrode assembly directly connected to the first current collecting piece is stacked with the first current collecting piece in the axial direction,
   wherein a surface of the first current collecting piece for contacting with the tab of the first electrode assembly and a surface of the tab of the first electrode assembly for contacting with the first current collecting piece are perpendicular to the axial direction of the receiving space and are substantially at a same height along the axial direction,
   the current collecting unit further comprises a second current collecting piece, the tab of the second electrode assembly extends in the first direction and is directly connected to the second current collecting piece, and a portion of the tab of the second electrode assembly directly connected to the second current collecting piece is stacked with the second current collecting piece in the axial direction, and
   the first current collecting piece and the second current collecting piece are directly connected to two ends of the first piece respectively and are connected with each other through the first piece.

2. The secondary battery according to claim 1, wherein the first current collecting piece comprises a first connection end connected to the first piece, the first connection end extends in the second direction perpendicular to both the axial direction and the first direction, and a thickness direction of the first current collecting piece is the same as the axial direction.

3. The secondary battery according to claim 1, wherein the first current collecting piece is located on a side of the first piece close to the case, and the tab of the first electrode assembly is connected to a surface of the first current collecting piece facing or facing away from the cap assembly.

4. The secondary battery according to claim 1, wherein the current collecting unit further comprises a first connection piece connected to the first piece, the first connection piece extends in the axial direction, a thickness direction of the first connection piece is parallel to the second direction perpendicular to both the axial direction and the first direction, and the first current collecting piece is connected to the first piece via the first connection piece.

5. The secondary battery according to claim 4, wherein the first current collecting piece comprises a first connection end connected to the first connection piece, the first connection end extends in the first direction, and a thickness direction of the first current collecting piece is the same as the axial direction.

6. The secondary battery according to claim 1, wherein the first piece comprises a main body portion extending in the axial direction and an extension portion connected to the main body portion, the extension portion extends beyond the main body portion in the second direction perpendicular to both the axial direction and the first direction, and the first current collecting piece and the second current collecting piece are respectively connected to two ends of the extension portion in the axial direction.

7. The secondary battery according to claim 6, wherein the first current collecting piece is closer to the cap assembly than the second current collecting piece, and the tab of the first electrode assembly is connected to a surface of the first current collecting piece facing the cap assembly, while the tab of the second electrode assembly is connected to a surface of the second current collecting piece facing away from the cap assembly.

8. The secondary battery according to claim 1, wherein the first current collecting piece and the second current collecting piece are at least partially overlapped in the axial direction.

9. The secondary battery according to claim 1, wherein the current collecting unit further comprises a first connection piece and a second connection piece connected to the first piece, the first connection piece and the second connection piece are spaced apart in the second direction perpendicular to both the axial direction and the first direction, and both extend in the axial direction, the first current collecting piece is connected to the first piece via the first connection piece, and the second current collecting piece is connected to the first piece via the second connection piece.

10. The secondary battery according to claim 9, wherein the first current collecting piece is closer to the cap assembly than the second current collecting piece, the tab of the first electrode assembly is connected to a surface of the first current collecting piece facing or facing away from the cap assembly, and the tab of the second electrode assembly is connected to a surface of the second current collecting piece facing or facing away from the cap assembly.

11. The secondary battery according to claim 9, wherein the first current collecting piece comprises a first connection end connected to the first piece, the second current collecting piece comprises a second connection end connected to the first piece, the first connection end and the second connection end both extend in the first direction, and thickness directions of the first current collecting piece and the second current collecting piece are both the same as the axial direction.

12. The secondary battery according to claim 1, wherein each of the first and second electrode assemblies comprises two electrode units, each of which comprises sub-end faces and sub-tabs extending from the sub-end faces, two sub-end faces on the same side of the electrode units constitute the end face, and two sub-tabs of the same polarity are assembled to constitute the tab, wherein the sub-tab of one of the two electrode units extends from a region of the sub-end face close to the other electrode unit in the axial direction.

13. The secondary battery according to claim 12, wherein each of the two electrode units in the first or second electrode assembly comprises two wide surfaces and two narrow surfaces connecting the two wide surfaces, the two wide surfaces are opposite to each other in the axial direction, and the wide surfaces and the narrow surfaces are alternately arranged, wherein the tab extends from a region of the end face close to two adjacent wide surfaces of the two electrode units.

14. The secondary battery according to claim 1, wherein the secondary battery comprises two current collecting units, the first and second electrode assemblies are disposed between the two current collecting units in the first direction, and each of the two current collecting units is electrically connected to the corresponding tab via the respective first current collecting piece.

15. A battery module, comprises two or more secondary batteries according to claim 1, wherein the two or more secondary batteries are arranged side by side.

16. The battery module according to claim 15, wherein the first current collecting piece comprises a first connection end connected to the first piece, the first connection end extends in the second direction perpendicular to both the axial direction and the first direction, and a thickness direction of the first current collecting piece is the same as the axial direction.

17. The battery module according to claim 15, wherein the first current collecting piece is located on a side of the first piece close to the case, and the tab of the first electrode assembly is connected to a surface of the first current collecting piece facing or facing away from the cap assembly.

18. The battery module according to claim 15, wherein the current collecting unit further comprises a first connection piece connected to the first piece, the first connection piece extends in the axial direction, a thickness direction of the first connection piece is parallel to the second direction perpendicular to both the axial direction and the first direction, and the first current collecting piece is connected to the first piece via the first connection piece.

19. The secondary battery according to claim 1, wherein each of the two or more electrode units in each of the first and second electrode assemblies comprises two wide surfaces and two narrow surfaces connecting the two wide surfaces, the two wide surfaces are opposite to each other, the wide surfaces and the narrow surfaces are alternately arranged, and the first and second electrode assembles are disposed in the receiving space of the case with the wide surfaces of the electrode units being perpendicular to the axial direction of the receiving space.

* * * * *